United States Patent
De Cuyper et al.

(10) Patent No.: US 10,882,242 B2
(45) Date of Patent: Jan. 5, 2021

(54) BLOW MOULD

(71) Applicant: RESILUX NV, Wetteren (BE)

(72) Inventors: Dirk De Cuyper, Destelbergen (BE); William Dierickx, Destelbergen (BE); Tom Anthierens, Wetteren (BE)

(73) Assignee: RESILUX NV, Wetteren (BE)

( * ) Notice: Subject to any disclaimer, the term of this patent is extended or adjusted under 35 U.S.C. 154(b) by 124 days.

(21) Appl. No.: 16/318,030

(22) PCT Filed: Jul. 19, 2017

(86) PCT No.: PCT/BE2017/000034
§ 371 (c)(1),
(2) Date: Jan. 15, 2019

(87) PCT Pub. No.: WO2018/014092
PCT Pub. Date: Jan. 25, 2018

(65) Prior Publication Data
US 2020/0247032 A1  Aug. 6, 2020

(30) Foreign Application Priority Data

Jul. 20, 2016 (BE) .................................. 2016/5609

(51) Int. Cl.
*B29C 49/52* (2006.01)
*B29C 33/38* (2006.01)
(Continued)

(52) U.S. Cl.
CPC .......... *B29C 49/52* (2013.01); *B29C 33/3842* (2013.01); *B29C 33/424* (2013.01); *B29C 49/06* (2013.01)

(58) Field of Classification Search
CPC ... B29C 49/52; B29C 33/3842; B29C 33/424; B29C 33/428
(Continued)

(56) References Cited

U.S. PATENT DOCUMENTS 3,267,522 A * 8/1966 Vukovich ............... B29C 49/52
                                                      425/525
3,380,121 A    4/1968 Chittenden et al.
(Continued)

FOREIGN PATENT DOCUMENTS

DE    20 2012 102 651 U1    10/2012
EP    0 676 251 A2          10/1995
(Continued)

OTHER PUBLICATIONS

Chad Hase, "Laser Texturing Adds Another Level of In-Mold Decoration Possibilities", Plastics Decorating, on-line article pp. 1-4, Nov. 5, 2015. (Year: 2015).*
(Continued)

*Primary Examiner* — Robert B Davis
(74) *Attorney, Agent, or Firm* — Birch, Stewart, Kolasch & Birch, LLP

(57) ABSTRACT

A blow mould includes at least first and second blow mould elements that inscribe a concavity; and at least one insert having an embossed surface to form a pattern onto a blow-moulded surface. The at least one insert is attached onto a surface of at least one of the first and/or second blow mould elements to form a part of the wall of the blow-moulded product. Such blow mould is an ISBM blow mould and the blow mould is such that the at least one insert is a plate having a wall thickness of between 0.2 mm and 2.0 mm and is attached onto at least one of the first and/or second blow mould elements by a reversible fixation mechanism selected from the group of adhesives, preferably a double-sided adhesive tape, a magnet and a geometric mechanism.

21 Claims, 2 Drawing Sheets

Figure 1:
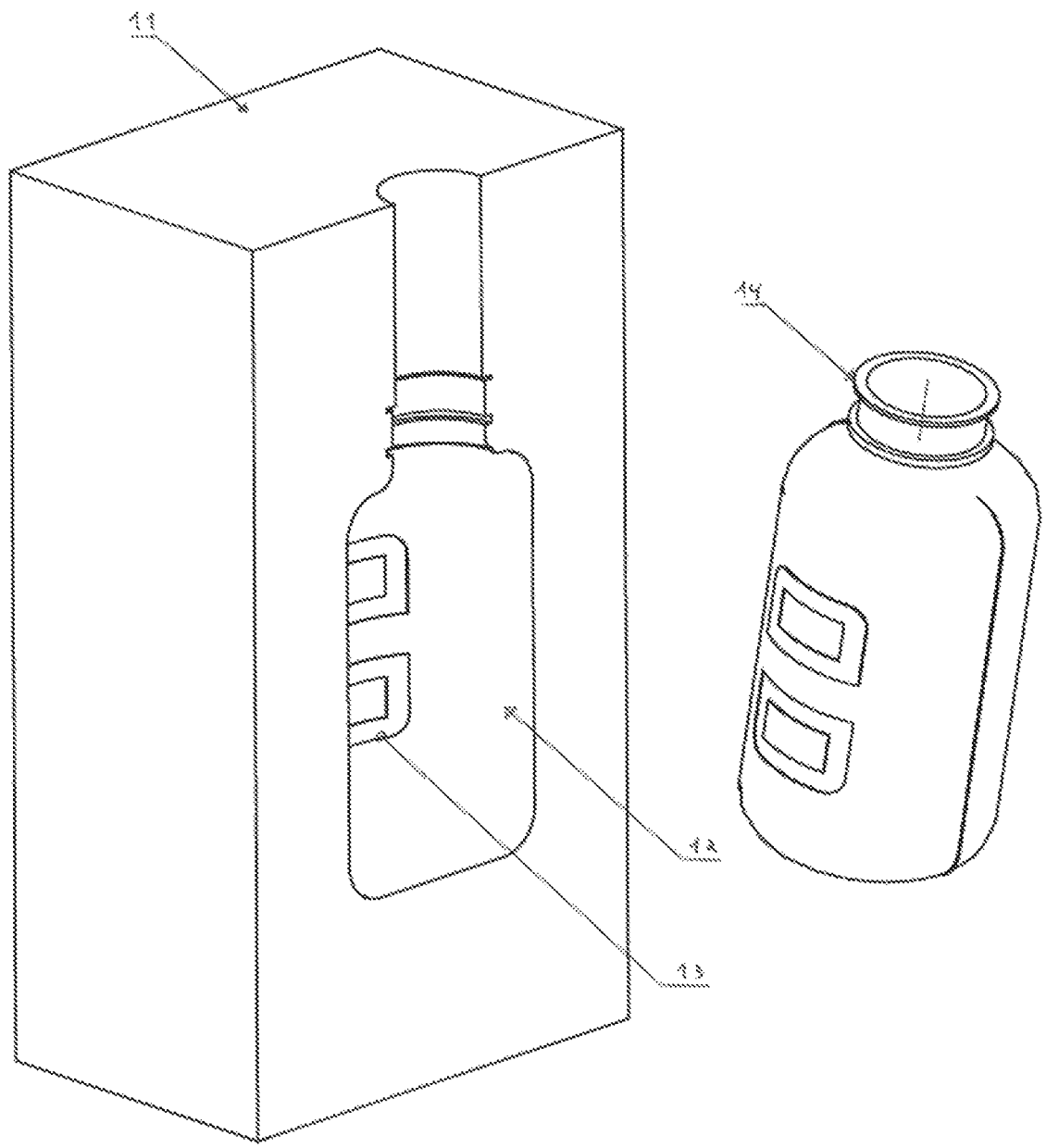

(51) Int. Cl.
*B29C 33/42* (2006.01)
*B29C 49/06* (2006.01)

(58) Field of Classification Search
USPC .................................................. 249/102, 103
See application file for complete search history.

(56) References Cited

U.S. PATENT DOCUMENTS

| | | | |
|---|---|---|---|
| 3,474,498 A | 10/1969 | Hoppes | |
| 5,505,125 A * | 4/1996 | Kapolnek | B29C 33/3842 |
| | | | 101/22 |
| 6,220,333 B1 * | 4/2001 | Cantwell | B22D 17/2245 |
| | | | 164/229 |
| 6,447,281 B1 | 9/2002 | Petre | |

FOREIGN PATENT DOCUMENTS

| | | |
|---|---|---|
| JP | 2000-025046 A | 1/2000 |
| JP | 2001-300941 A | 10/2001 |

OTHER PUBLICATIONS

Database WPI, week 200016, Thomson Scientific, London, GB; AN 2000-175838, XP-002768953, 2017, 2 pages.
Database WPI, week 200221, Thomson Scientific, London, GB; AN 2002-158395, XP-002768952, 2017, 2 pages.
International Search Report (PCT/ISA/210) issued in PCT/BE2017/000034, dated Dec. 12, 2017.
Written Opinion (PCT/ISA/237) issued in PCT/BE2017/000034, dated Dec. 12, 2017.

* cited by examiner

BLOW MOULD

SCOPE OF THE TECHNOLOGY

The present invention relates to a blow mould, a method for producing the blow mould and the use of the blow mould in blow processes such as injection stretch blow moulding (ISBM), injection blow moulding (IBM) or extrusion blow moulding (EBM) and for all products from all plastics that may be blown using these techniques, such as polyesters (PET, PETG, etc.) and polyolephines (PP, PE, etc.) blow-moulded products.

STATE OF THE ART

It is generally known that various ways already exist to provide products produced by a blow process with a pattern through embossing. The known solutions can largely be divided into two groups. In a first group, the desired pattern is applied to the wall of a blow mould. During blowing, the bottle will adopt this shape. This method has two major disadvantages. On the one hand, a different blow mould needs to be constructed for each change in the pattern design. On the other hand, the pattern design also needs to be applied to a bent surface in the blow mould. As a result, a pattern can only be applied by milling. In order to obtain the desired detailing, this is a time-consuming manner. This results in a very expensive solution that is not flexible to change pattern design.

In a second group, a bottle is blown without embossing in a standard moulding first, and afterwards this bottle is provided with an embossing by pressing a stamp into the bottle. Here the stamp can be placed on either the inside or the outside of the container. The advantage of this method compared with milling into the moulding is that there is an increased flexibility in the production and changing the stamps. However, the major disadvantage is that the detailing in transferring the embossing via the stamp is quite poor.

Patent EP0676251 in the name of Obrist & Co AG describes a method where a stamp is placed on the inside of a metal tube, and this is subsequently pressed through in order to obtain an embossing.

U.S. Pat. No. 3,474,498 in the name of The National Latex Products Company describes a thin, flexible path or plate from rubber-like plastic material provided with suitable three-dimensional design configurations to its one side and with air ventilation means to its other side, which communicates with the inter-spaces of said design configurations without affecting the design-forming accuracy of the latter. The plate is positioned in a suitable manner and attached to an object-forming surface part of the moulding for said inter-spaces to communicate with existing air ventilation passage means normally applied in the form of concavity surfaces by means of the ventilation means to the underside of the plaster. By ventilating the air of the product-forming design configurations in this manner, air pockets are eliminated and the designs formed by the plate are therefore sharp and undamaged.

OBJECTIVES OF THE INVENTION

In particular, the invention aims to overcome these disadvantages of the state of the art. More in particular, an objective of the invention according to at least one of the embodiments is to provide a blow mould with a very flexible and adaptable embossed surface.

Even more in particular, the present invention aims to provide a blow mould that is suitable for repeated exposure to strong pressure forces during the blow process, in particular strong pressure forces (up to 50 bars) that occur during the ISBM blow process.

Another objective of the invention according to at least one of the embodiments is to implement a method to produce a blow mould using a very flexible and adaptable manner of a pattern onto a blow-moulded product.

Another objective of the invention according to at least one of the embodiments is to implement a method to produce an ISBM blow mould using a very flexible and adaptable manner of a pattern onto a blow-moulded product.

In at least one of its embodiments, the invention relates to the use of a blow mould using a very flexible and adaptable manner to apply a pattern onto an embossed surface.

In at least one of its embodiments, the invention relates to the use of an ISBM blow mould using a very flexible and adaptable manner to apply a pattern onto an embossed surface.

DESCRIPTION OF THE INVENTION

The present invention aims to offer a solution to the aforementioned requirements. The present invention provides a blow mould comprising at least a first and a second blow mould element provided to inscribe a concavity, at least one insert having an embossed surface provided to form a pattern onto a blow-moulded surface, where the aforementioned at least one insert is attached onto a surface of at least one of the aforementioned first and/or the aforementioned second blow mould element and provided to form a part of a wall of the blow-moulded product. According to the invention, such blow mould is such that the aforementioned at least one insert is a plate having a wall thickness of between 0.2 mm and 2.0 mm, where the aforementioned at least one insert is attached onto at least one of the aforementioned first and/or the aforementioned second blow mould element by reversible fixation means selected from the group consisting of adhesives, preferably a double-sided adhesive tape, a magnet and geometric means.

The invention describes an insert having a wall thickness of between 0.2 mm and 2.0 mm which can be deployed to inexpensively provide products produced using this blow mould with an embossing.

The general principle of the invention is to add a flat insert having a wall thickness of between 0.2 mm and 2.0 mm into a blow mould in order to produce a blow-moulded product with a desired pattern.

The inventors have found that, surprisingly, the use of a flat insert having a wall thickness of between 0.2 mm and 2.0 mm leads to a very flexible system.

Indeed, it is a major advantage of this blow mould that various forms of a pattern design by embossing can be changed in a very flexible manner. An additional advantage is the cost price. On the one hand, these blow moulds are cheaper in applying the embossing, and the cost price can be vastly limited when modifying this insert.

The words "geometric means" refer to mechanical or dimensional fixation means.

The word "pattern" relates to the result of the embossing on the product.

In a particular embodiment of the invention, mentioned blow mould comprises a third blow mould element, provided to form a base of the aforementioned blow-moulded product, and where the aforementioned first and the aforementioned second blow mould elements have been provided to form a part of the aforementioned wall or the aforementioned blow-moulded product.

An advantage is that a third blow mould element allows a separate demoulding movement when opening the blow mould leading to a greater freedom in design for the base of the blow-moulded product.

In a particular embodiment, the blow mould according to the invention is such that mentioned blow mould elements are made from a metal selected from the group consisting of steel and aluminium, preferably aluminium.

An advantage is that metal blow mould elements have the required strength to absorb the force that occurs by the large number of movements, up to 3000 movements/hour per cavity, and the pressure required to blow the products, up to 50 bars of pressure.

Aluminium blow mould elements have the additional advantage that they are lighter than steel blow mould elements and so less energy and power is required to carry out the necessary movements.

In a particular embodiment, the blow mould according to the invention is such where the aforementioned insert is selected from the group consisting of metal and plastic, preferably metal.

An advantage is that metal and plastic inserts have the required strength to absorb the force that occurs by the large number of movements, up to 3000 movements/hour per cavity, to withstand and the pressure required to blow the products, up to 50 bars of pressure. The inserts may be from plastics too, as this is supported by blow mould elements and are therefore exposed to less power than the latter.

An additional advantage is that techniques are known for both metal and plastic, for example, chemical etching, laser etching or the technique used for the production of photo polymer plates which allow for an embossing to be applied very easily and cheaply onto a flat surface in these materials.

In a particular embodiment of the former, the blow mould according to the invention is such where the aforementioned insert is made from metal selected from the group consisting of aluminium, steel and copper, preferably from steel, in particular sheet steel.

An advantage is that metal inserts have a greater wear resistance and allow for a higher level of detailing. Here, sheet steel is a preferred material, as (1) it is available in the desired thickness as standard, (2) an embossing having a high level of detailing can be applied to it in an easy manner via for example chemical etching without an additional post-processing step being required, (3) it is a particularly wear-resistant material so that the inserts have a long lifespan, (4) it allows for the form of the blow mould to be easily adopted by bending and (5) the material allows for a magnetic attachment into the blow mould elements. In a particular embodiment, the blow mould according to the invention is such that the aforementioned insert forms the largest part of the tube-shaped surface of the concavity provided to form a part of the side wall of the blow-moulded product.

An advantage is that metal inserts have a greater wear resistance and allow for a higher level of detailing. Here, tin steel is a preferred material, as (1) it is available in the desired thickness as standard, (2) an embossing having a high level of detailing can be applied to it in an easy manner via for example chemical etching without an additional post-processing step being required, (3) it is a particularly wear-resistant material so that the inserts have a long lifespan, (4) it allows for the form of the blow mould to be easily adopted by bending and (5) the material allows for a magnetic attachment into the blow mould elements. In a particular embodiment, the blow mould according to the invention is such that the aforementioned insert forms the largest part of the tube-shaped surface of the concavity provided to form a part of the side wall of the blow-moulded product.

An advantage is that, in this manner, no part line is visible in the product between the insert and the blow mould element.

In a particular embodiment, the blow mould according to the invention is such that at least one of the aforementioned first (22) and/or second (23) blow mould element comprise an indentation provided to place the insert.

An advantage is that a part line between the insert and the blow mould is minimalised.

In a particular embodiment, the blow mould according to the invention is such that mentioned blow mould elements are from aluminium and the aforementioned insert is from steel.

An advantage is that the advantages of the aluminium blow mould elements are combined with the advantages of the steel inserts.

In a particular embodiment, the blow mould according to the invention is such that mentioned insert is cylindrical or half cylindrical.

An advantage is that it is very easy to pre-bend the inserts into a cylindrical or half cylindrical shape and as such adopt the shape of the blow mould well.

In a particular embodiment, the blow mould according to the invention is such that mentioned insert is a plate having a wall thickness of between 0.5 mm and 1.5 mm, preferably of between 0.5 mm and 1.0 mm, in particular of between 0.6 mm and 0.8 mm.

An advantage is that this plate thickness still allows for them to be easily bent and as such adopt the shape of the blow mould well, while still being thick enough to have an embossing applied to them which can be transferred with the desired detailing into the blow-moulded product.

In a particular embodiment, the blow mould according to the invention is such that mentioned embossing has a depth of between 0.2 mm and 0.8 mm, preferably of between 0.6 mm and 0.8 mm for a PET blow-moulded product and of between 0.2 mm and 0.4 mm for a PP or PE blow-moulded product.

An advantage is that these embossing depths allow for a pattern with desired detailing still to be transferred into the relevant materials.

The invention also relates to a production method of the blow mould according to the invention.

According to a preferred embodiment method of the invention, the method is such that the aforementioned method comprises at least a step of embossing the aforementioned insert, where the aforementioned insert is preferably from metal, selected from the group consisting of chemical etching, laser etching and tidying, preferably chemical etching.

An advantage is that the aforementioned method of embossing allows for a much higher level of detailing to be obtained. An additional advantage of the chemical etching is that the aforementioned chemical etching allows for a very high level of detailing to be obtained at no extra cost compared with other methods, such as engraving or milling.

The invention also relates to the method as described above where the step of embossing comprises the subsequent steps:

a. providing a pattern mask onto a surface of the aforementioned metal insert, b. chemical etching of the aforementioned surface of the aforementioned metal insert by the aforementioned pattern mask so that an embossing of the aforementioned surface of the aforementioned metal insert is formed, c. removing the aforementioned pattern mask.

The invention still relates to the method as described above which comprises a step of bending the aforementioned insert. An advantage is that this method can be carried out onto a flat plate, following which it is bent in order to adopt the form of the blow mould.

A particular embodiment of the invention provides an ISBM blow mould comprising at least a first and a second blow mould element provided to inscribe a concavity, at least one insert having an embossed surface provided to form a pattern onto a blow-moulded surface, where the aforementioned at least one insert is attached onto a surface of at least one of the aforementioned first and/or the aforementioned second blow mould element and provided to form a part of a wall of the blow-moulded product. According to the invention, such ISBM blow mould is such that the aforementioned at least one insert is a plate having a wall thickness of between 0.2 mm and 2.0 mm, where the aforementioned at least one insert is attached onto at least one of the aforementioned first and/or the aforementioned second ISBM blow mould element by reversible fixation means selected from the group consisting of adhesives, preferably a double-sided adhesive tape, a magnet and geometric means.

The inventors have found that, surprisingly, an advantage of this embodiment is that the ISBM blow mould having at least one insert having a wall thickness of between 0.2 mm and 2.0 mm can offer sufficient resistance against the pressure forces that occur during the ISBM blow process.

An advantage of the invention is that an ISBM blow mould according to at least one embodiment according to the invention can also be used repeatedly with limited wear.

An advantage of the invention according to at least one of the aforementioned embodiments is that the aforementioned wall thickness allows for an ISBM blow mould to be produced in a very economical manner. Also, the aforementioned blow mould can also be made from a strong material without requiring a labour or material intensive production step being required, where reference to "strong material" can refer to materials which can offer sufficient pressure resistance to at least 50 bars and this for sufficient production cycles, i.e. a minimum of 1000000 cycles on an annual basis. Via etching, an embossing up to a maximum of 2.0 mm deep can be applied, which approximately corresponds with the intended depth for embossing into an ISBM blow mould.

The scope of the invention also comprises the use of the blow mould according to this description in order to make a blow-moulded product either by "Injection Stretch Blow Moulding" (ISBM) engineering or "Extrusion Blow Moulding" (EBM) engineering.

SHORT DESCRIPTION OF THE FIGURES

With the insight of better showing the features of the invention, a preferred embodiment of a blow mould according to the present invention is described below as an example without any limiting feature, with reference to the accompanying drawings in which FIG. 1 is an illustration of a present blow mould according to the state of the art.

Figure 2:
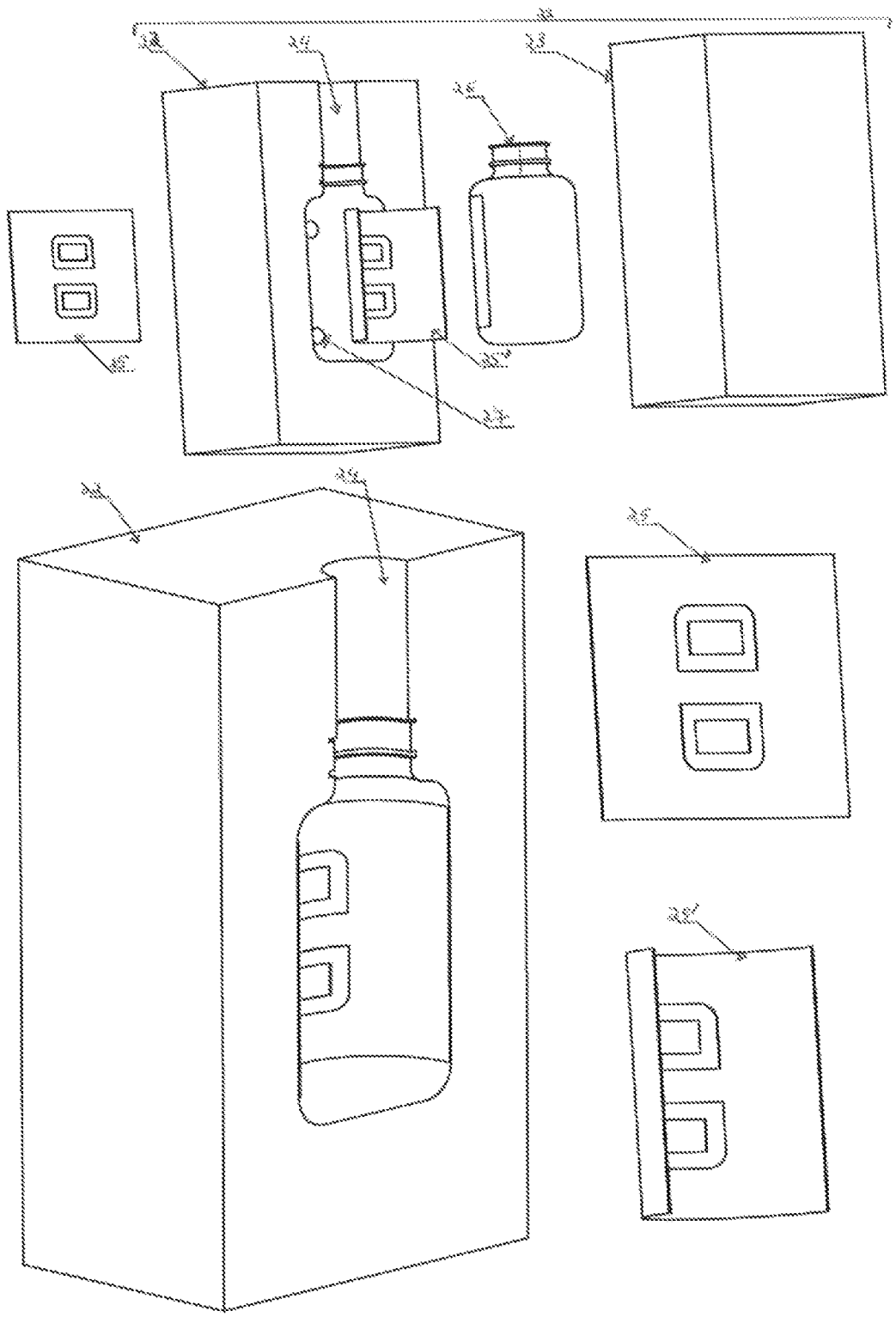

FIG. 2 is an exploded view of the blow mould comprising the blow mould elements, the insert and the blow-moulded product according to the invention.

DETAILED DESCRIPTION

FIG. 1 shows a blow mould 11 according to the state of the art. The blow mould comprises two elements that inscribe a concavity 12. The desired pattern 13 is applied to the wall of the element of the blow mould 11 to form a pattern onto a blow-moulded product 14.

FIG. 2 shows a preferred embodiment of a blow mould 21 according to the present invention. This moulding consists of two blow mould elements 22 and 23 that inscribe a concavity 24. The blow mould 21 is preferably made from aluminium.

This concavity 24 is provided to form a blow-moulded product. One of the blow mould elements comprises an indentation 27 to receive an insert 25. This insert 25 is provided to form a part of the wall of the blow-moulded product 26. The insert 25 has an embossed surface to form a pattern onto a blow-moulded product and is preferably attached onto a surface of the first blow mould element 22 by a double-sided adhesive tape, a magnet or geometric means.

The insert 25 is preferably a half cylindrical metal plate of sheet steel having a wall thickness of between 0.6 mm and 0.8 mm. The insert 25 forms the largest part of the tube-shaped surface of the blow-moulded concavity 24.

The embossing is preferably between 0.6 mm and 0.8 mm for a PET blow-moulded product 26 and between 0.2 mm and 0.4 mm for a PP or PE blow-moulded product 26.

The main difference between FIGS. 1 and 2 is that an insert is added to the invention.

Preferably, the blow mould 21 described is according to a method comprising the subsequent steps:

a. providing a pattern mask onto the surface of the metal plate 25, b. chemical etching of the surface of the metal plate 25 by the aforementioned pattern mask so that an embossing is formed of the surface of the metal plate 25, c. removing the aforementioned pattern mask.

This method also comprises a step of bending the plate 25.

The invention is also suitable for use of the blow mould 21 described to make a blow-moulded product 26. Of course, the invention is not limited to the foregoing embodiments.

The invention claimed is:

1. A blow mould comprising:
    at least a first and a second blow mould element provided to inscribe a concavity; and
    at least one insert having an embossed surface provided to form a pattern onto a blow-moulded surface, where the at least one insert is attached onto a surface of at least one of the first and/or the second blow mould elements to form a part of a wall of a blow-moulded product, wherein the blow mould is an ISBM blow mould, where the at least one insert is a plate having a wall thickness of between 0.2 mm and 2.0 mm and is attached onto at least one of the first and/or the second blow mould elements by reversible fixation means selected from the group consisting of adhesives, a magnet and geometric means, and the at least one insert is made from steel.

2. The blow mould according to claim 1, where the blow mould comprises at least a third blow mould element, provided to form a base of the blow-moulded product, and where the first and the second blow mould elements are provided to form the part of the wall of the blow-moulded product.

3. The blow mould according to claim 1, where the blow mould elements are made from a metal selected from the group consisting of steel and aluminium.

4. The blow mould according to claim 1, where the insert forms a largest part of a tube-shaped surface of the concavity provided to form the part of the wall of the blow-moulded product.

5. The blow mould according to claim 1, where at least one of the first and/or second blow mould elements comprises an indentation provided to place the insert.

6. The blow mould according to claim 1, where the insert is cylindrical or half cylindrical.

7. The blow mould according to claim 1, where the insert is a plate having a wall thickness of between 0.5 mm and 1.5 mm.

8. The blow mould according to claim 1, where the embossing has a depth of between 0.2 mm and 0.8 mm.

9. A method to produce a blow mould according to claim 1, where the method comprises at least a step of embossing the insert, and where the step of embossing comprises the subsequent steps:
providing a pattern mask onto a surface of the steel insert;
etching of the surface of the steel insert by a pattern mask so that an embossing of the surface of the steel insert is formed;
removing the pattern mask; and bending of the insert.

10. A method of producing a blow-moulded product, comprising the step of providing the blow mould according to claim 1; and
forming a product within the blow mould.

11. The blow mould according to claim 1, wherein the adhesives are double-sided adhesive tape, and the at least one insert is made from sheet steel.

12. The blow mould according to claim 1, where the blow mould elements are made from aluminium.

13. The blow mould according to claim 1, where the insert is a plate having a wall thickness of between 0.5 mm and 1.0 mm.

14. The blow mould according to claim 1, where the insert is a plate having a wall thickness of between 0.6 mm and 0.8 mm.

15. The blow mould according to claim 1, where the embossing has a depth of between 0.6 mm and 0.8 mm for a PET blow-moulded product and of between 0.2 mm and 0.4 mm for a PP or PE blow-moulded product.

16. The method according to claim 9, wherein the etching is chemical etching.

17. The blow mould according to claim 2, where the blow mould elements are made from a metal selected from the group consisting of steel and aluminium.

18. The blow mould according to claim 2, where the insert forms a largest part of a tube-shaped surface of the concavity provided to form the part of the wall of the blow-moulded product.

19. The blow mould according to claim 3, where the insert forms a largest part of a tube-shaped surface of the concavity provided to form the part of the wall of the blow-moulded product.

20. The blow mould according to claim 2, where at least one of the first and/or second blow mould elements comprises an indentation provided to place the insert.

21. The method according to claim 9, wherein the etching is selected from the group consisting of chemical etching, laser etching and tidying.

* * * * *